(12) United States Patent
Kumar et al.

(10) Patent No.: US 12,044,381 B2
(45) Date of Patent: Jul. 23, 2024

(54) LIGHT FIXTURE WITH LIGHTGUIDE TRIM

(71) Applicant: SIGNIFY HOLDING B.V., Eindhoven (NL)

(72) Inventors: Jyoti Kumar, Tyrone, GA (US); Jacob Todd Zimmerman, Decatur, GA (US); Ying Chen, Xiamen (CN)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/036,184

(22) PCT Filed: Nov. 5, 2021

(86) PCT No.: PCT/EP2021/080816
§ 371 (c)(1),
(2) Date: May 10, 2023

(87) PCT Pub. No.: WO2022/101106
PCT Pub. Date: May 19, 2022

(65) Prior Publication Data
US 2023/0400163 A1 Dec. 14, 2023

Related U.S. Application Data

(60) Provisional application No. 63/112,433, filed on Nov. 11, 2020.

(30) Foreign Application Priority Data

Jul. 5, 2021 (EP) ..................................... 21183618

(51) Int. Cl.
*F21S 8/02* (2006.01)
*F21V 8/00* (2006.01)
(Continued)

(52) U.S. Cl.
CPC .............. *F21S 8/026* (2013.01); *F21V 13/04* (2013.01); *F21V 37/0095* (2013.01);
(Continued)

(58) Field of Classification Search
CPC ...... F21S 8/026; F21V 13/04; F21V 37/0095; G02B 6/0031
See application file for complete search history.

(56) References Cited

U.S. PATENT DOCUMENTS 11,725,787 B2 * 8/2023 Huang .................... F21V 23/06
362/612
11,761,597 B1 * 9/2023 Zheng .................... F21S 8/026
362/235

(Continued)

FOREIGN PATENT DOCUMENTS

EP 3330593 A1 6/2018
GB 2561035 A 10/2018

*Primary Examiner* — Christopher E Dunay

(57) ABSTRACT

A recessed light fixture includes a first light source that emits a first light, a second light source that emits a second light and a reflector positioned to reflect at least a portion of the first light. The recessed light fixture further includes a lightguide trim positioned around at least a portion of the reflector. The second light source is positioned to emit the second light toward a narrow edge of the lightguide trim.

14 Claims, 14 Drawing Sheets

(51) Int. Cl.
  *F21V 13/04* (2006.01)
  *F21V 37/00* (2006.01)
  *F21Y 105/12* (2016.01)
  *F21Y 115/10* (2016.01)

(52) U.S. Cl.
  CPC ......... *G02B 6/0031* (2013.01); *G02B 6/0058* (2013.01); *F21V 2200/20* (2015.01); *F21Y 2105/12* (2016.08); *F21Y 2115/10* (2016.08)

(56) References Cited

U.S. PATENT DOCUMENTS

| | | | |
|---|---|---|---|
| 11,879,629 B2 * | 1/2024 | Calaceto | F21V 7/0008 |
| 11,913,624 B2 * | 2/2024 | Strunk | F21V 21/041 |
| 11,913,629 B1 * | 2/2024 | Rashidi Doust | F21V 25/12 |
| 2021/0054979 A1 | 2/2021 | Van Winkle | |

* cited by examiner

LIGHT FIXTURE WITH LIGHTGUIDE TRIM

CROSS-REFERENCE TO PRIOR APPLICATIONS

This application is the U.S. National Phase application under 35 U.S.C. § 371 of International Application No. PCT/EP2021/080816, filed on Nov. 5, 2021, which claims the benefit of U.S. Provisional Patent Application No. 63/112,433, filed on Nov. 11, 2020, and European Patent Application No. 21183618.4, filed on Jul. 5, 2021. These applications are hereby incorporated by reference herein.

TECHNICAL FIELD

The present disclosure relates generally to lighting fixtures, and more particularly to light fixtures with a lightguide that serves as a trim.

BACKGROUND

Typically, multiple light fixtures are used to provide different lights. For example, one light fixture may provide a full illumination light, and another light fixture may provide a night light. As another example, one light fixture may provide an illumination light, and another light fixture may provide an indicator or messaging (e.g., alert) light. However, using multiple light fixtures may have challenges related to cost, installation space, etc. Thus, a solution that enables a light fixture to provide lights for different purposes may be desirable.

SUMMARY

The present disclosure relates generally to lighting fixtures, and more particularly to light fixtures with a lightguide that serves as a trim. In an example embodiment, a recessed light fixture includes a first light source that emits a first light, a second light source that emits a second light, and a reflector positioned to reflect at least a portion of the first light. The recessed light fixture further includes a lightguide trim positioned around at least a portion of the reflector. The second light source is positioned to emit the second light toward a narrow edge of the lightguide trim.

These and other aspects, objects, features, and embodiments will be apparent from the following description and the appended claims.

BRIEF DESCRIPTION OF THE FIGURES

Reference will now be made to the accompanying drawings, where.

Figure 1A:
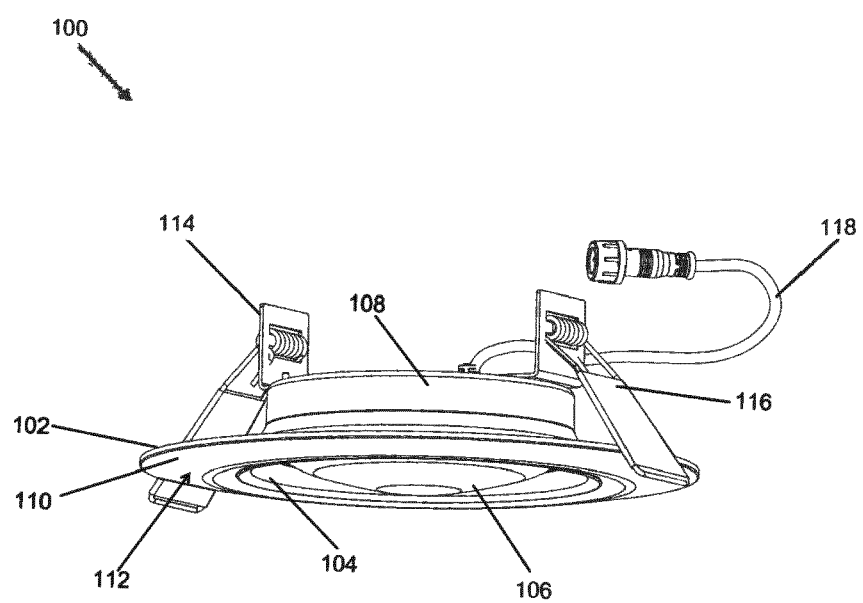
FIGS. 1A and 1B illustrate different views of a recessed light fixture according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals that are used in different drawings designate like or corresponding, but not necessarily identical elements.

DETAILED DESCRIPTION OF EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Figure 1B:
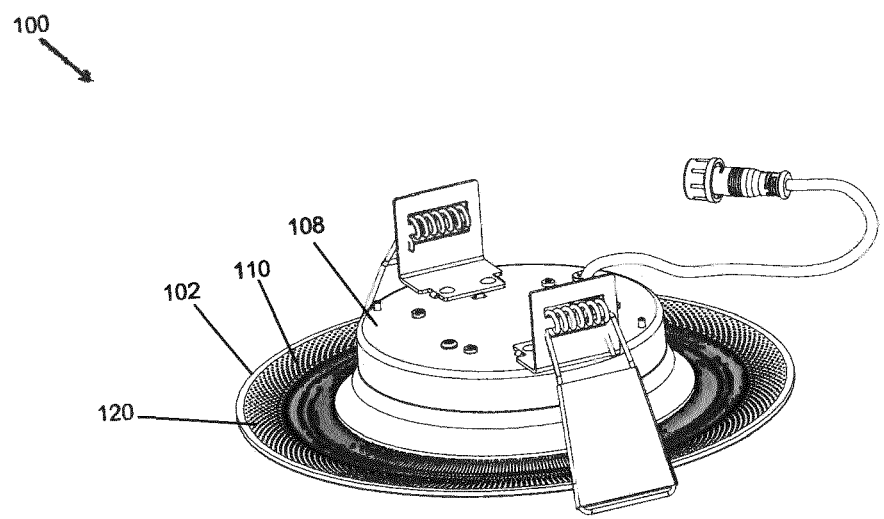
Figure 2:
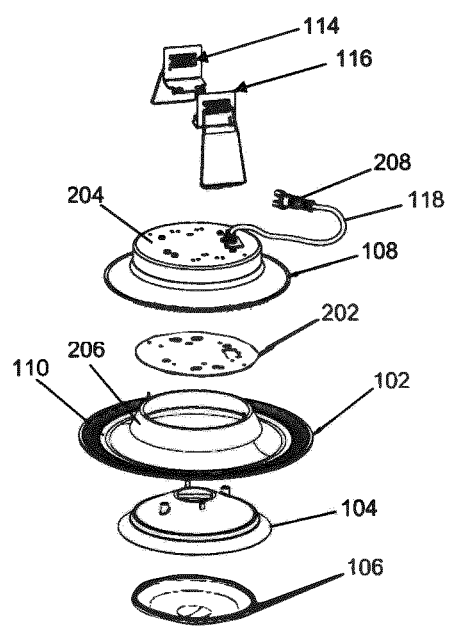
FIG. 2 illustrates an exploded view of the light fixture of FIG. 1A according to an example embodiment.

FIGS. 1A and 1B illustrate different views of a recessed light fixture 100 according to an example embodiment, and FIG. 2 illustrates an exploded view of the light fixture 100 of FIG. 1A according to an example embodiment. For example, the recessed light fixture 100 may be a direct mount light fixture. In some example embodiments, the light fixture 100 may include a lightguide trim 102, a reflector 104, a lens 106, and a housing 108. The housing 108 may serve as a heat sink to receive and dissipate heat from a light source board 202 shown in FIG. 2. The lens 106 may be attached to the reflector 104, and the reflector 104 may be attached and/or secured to the light source board 202 and the housing 108.

In some example embodiments, the light fixture 100 may provide a first light through the lens 106 to an area below the light fixture 100 when the light fixture 100 is mounted in a ceiling in the orientation of shown in FIG. 1A. The light fixture 100 may also provide a second light through a broad surface 112 of a flange portion 110 of the lightguide trim 102 toward area below the light fixture 100.

As explained in more detail below, the first light provided through the lens 106 may be emitted by a first light source, and the second light that is emitted through the broad surface 112 of the flange portion 110 may be emitted by a second light source. For example, the first light may be a down light that provides an illumination to the area below the light fixture 100. The second light may be a nightlight that may have a dim level and/or color temperature (e.g., low brightness level and/or warm color temperature) of typical night light as can be readily understood by those of ordinary skill in the art with the benefit of the scope of this disclosure.

In some example embodiments, the lightguide trim 102 may include an upper portion 206 and the flange portion 110 that extends from upper portion 206 as more clearly shown in FIG. 2. At least a portion of the upper portion 206 of the lightguide trim 102 may be positioned in the cavity of the housing 108. The upper portion 206 of the lightguide trim 102 may also surround at least a portion of the reflector 104. The reflector 104 is positioned such that an inner surface of the reflector 104 reflects a portion of the first light emitted by the first light source toward the area below the light fixture 100.

In some example embodiments, at least a portion of the flange portion 110 of the lightguide trim 102 may be positioned outside of the cavity of the housing 108. The flange portion 110 may have a broad surface 120 that may have patterns designed to reflect light traveling the through the lightguide trim 102 resulting in increased amount of light the exiting through the broad surface 112. In some alternative embodiments, the broad surface 112 may not include a pattern. In some example embodiments, the broad surface 112 of the flange portion 110 and other surfaces of the lightguide trim 102 may include patterned surfaces.

In some example embodiments, the light source board 202 shown in FIG. 2 may be positioned in a cavity of the housing 108. For example, the light source board 202 may be attached to a back wall 204 of the housing 108 in the cavity of the housing 108. An electrical cable 118 may be used to provided electrical power to the light sources of the light source board 202. For example, the electrical cable 118 may be terminated at a connector 208 that can be plugged into a mating connector of a driver.

In some example embodiments, attachment structures 114, 116 may be attached to the back wall 204 of the housing 108. The attachment structures 114, 116 may be spring based attachments structures. The attachment structures 114, 116 may retain the light fixture 100 recessed in a ceiling as can be readily understood by those of ordinary skill in the art with the benefit of the scope of this disclosure.

In some example embodiments, the lightguide trim 102 may be made from polycarbonate 5VA material or another suitable material (e.g., acrylic) using methods such as molding. The reflector 104 may be made from plastic or another optically opaque material using methods such as molding. The reflector 104 may be white or may have another suitable color to reflect light. The lens 106 may be from a translucent material such as acrylic, glass, etc. The housing 108 may be made from a metal (e.g., aluminum) or another suitable material that enables the housing 108 to serve as a heat sink to dissipate. For example, stamping and other methods may be used to make the housing 108 as can be readily understood by those of ordinary skill in the art with the benefit of the scope of this disclosure.

In general, the lightguide trim 102 serves as a trim of the light fixture 100 as well as to direct light toward a desired area. The light sources of the light source board 202 may be controlled such that the first light (i.e., the light that is emitted through the lens 106) is emitted or the second light (i.e., the light emitted through the broad surface 112) is emitted by the light fixture 100. Alternatively, both of the first light and the second light may be emitted. Alternatively, neither the first light nor the second light may be emitted at one particular time.

In some alternative embodiments, the components of the light fixture 100 may have a different shape than shown without departing from the scope of this disclosure. For example, the lightguide trim 102 may have a different shape than shown.

Figure 3:
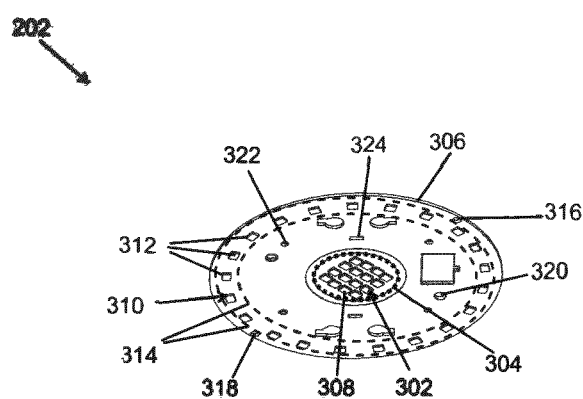
FIG. 3 illustrates a bottom perspective view of a light source board of the light fixture of FIG. 1A according to an example embodiment.

FIG. 3 illustrates a bottom perspective view of the light source board 202 of the light fixture 100 according to an example embodiment. Referring to FIGS. 1A-3, the light source board 202 includes a light source 302 and a light source 310. The light source 302 is shown inside a dotted circle 304 for illustrative purposes. The light source 310 is shown between dotted circles 314 for illustrative purposes. The light source board 202 may also include a controller (not shown) that may be used to control the operations of the light sources 302, 310 as can be readily understood by those of ordinary skill in the art with the benefit of the scope of this disclosure.

In some example embodiments, the light source 302 may include light emitting diodes (LEDs) 308, and the light source 310 may include LEDs 312. Reference number 308 as used in and with respect to FIG. 3 is intended to refer to all LEDs inside the dotted circle 304 individually and collectively, and reference number 312 is intended to refer to all LEDs between the dotted circles 314 individually and collectively. The LEDs 308, 312 may be mounted to a printed circuit board 306.

In some example embodiments, the light source 302 may emit a light that passes through the lens 106 directly from the light source 302 and after reflection by the reflector 104. The light source 310 may emit the second light that enters the lightguide trim 102 through a narrow edge of the lightguide trim 102 and is emitted through the broad surface 112 as explained in more detail below. The LEDs 312 of the light source 310 may be located around the LEDs 308 of the light source 302. As shown in FIG. 3, the LEDs 308 of the light source 302 and the LEDs 312 of the light source 310 are located on the same side of light source board 202.

In some example embodiments, the light source board 202 may include holes 316, 318 that are used to insert therethrough guide poles protruding out from the lightguide trim 102. The guide poles protruding out from the lightguide trim 102 may be used to position the light source board 202 in a desired position with respect to the light source board 202 and the housing 108. The light source board 202 may also include holes, such as a hole 320, that are used to insert a respective fastener therethrough to secure the reflector 104 to the light source board 202 and the housing 108. The light source board 202 may also include holes, such as a hole 322, that are used to insert a respective fastener therethrough to secure the light source board 202 to the back wall 204 of the housing 108. The light source board 202 may also include holes, such as a hole 324, that are used to insert therethrough guide poles protruding out from the reflector 104. The guide poles protruding out from the reflector 104 may be used to position the reflector 104 in a desired position with respect to the light source board 202 and the housing 108.

In some alternative embodiments, the light source board 202 may have a different shape than shown without departing from the scope of this disclosure. In some alternative embodiments, the light source board 202 may include more than two light sources. In some alternative embodiments, the light source 302 and the light source 310 may be attached to separate circuit boards without departing from the scope of this disclosure. In some alternative embodiments, the LEDs 308 of the light source 302 and the LEDs 312 of the light source 310 may be at different locations than shown without departing from the scope of this disclosure. In some alternative embodiments, the light sources 302 and 310 may each include more or fewer LEDs than shown without departing from the scope of this disclosure. In some alternative embodiments, the LEDs of the light sources 302 and 310 may be arranged in a different configuration than shown without departing from the scope of this disclosure. In some alternative embodiments, the light source 302 and the light source 310 may each include a single LED without departing from the scope of this disclosure.

Figure 4A:
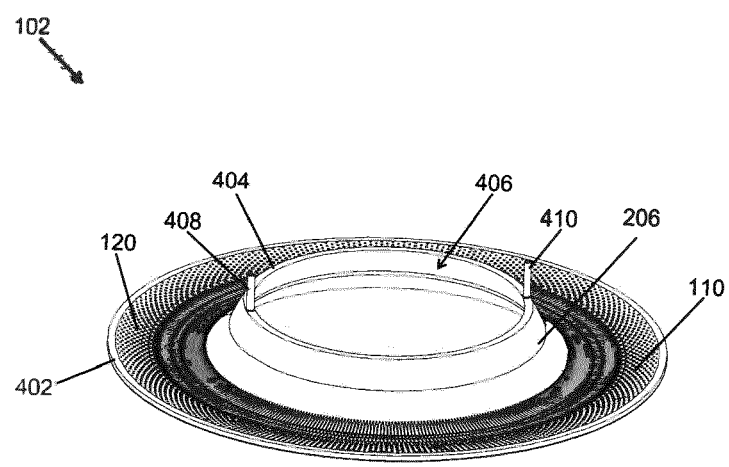
FIG. 4A illustrates a top perspective view of a lightguide trim of the light fixture of FIG. 1A according to an example embodiment.
Figure 4B:
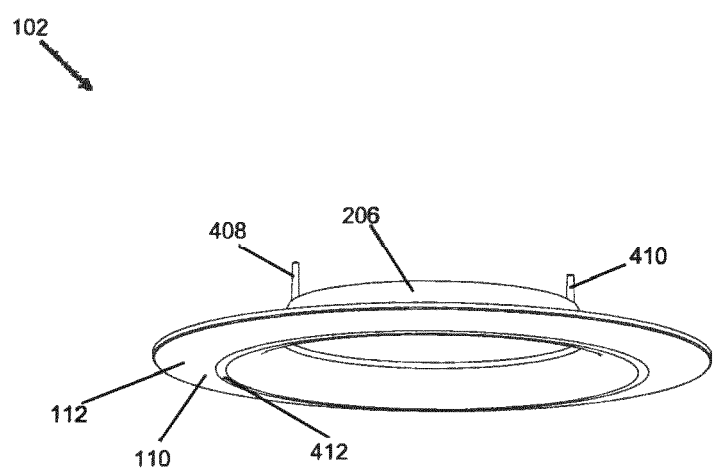
FIG. 4B illustrates a bottom perspective view of the lightguide trim of the light fixture of FIG. 1A according to an example embodiment.
Figure 4C:
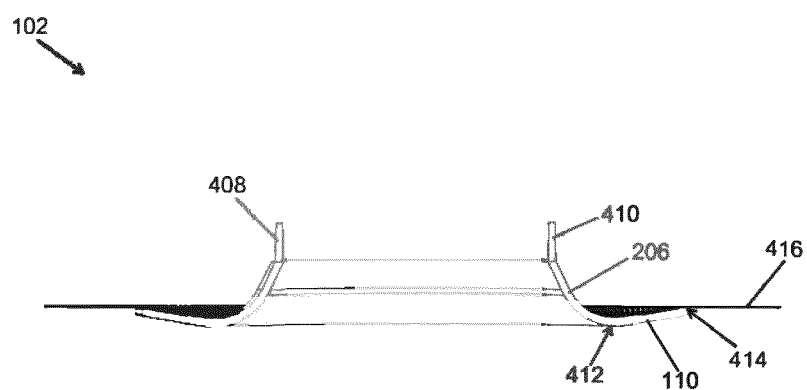
FIG. 4C illustrates a cross-sectional view of the lightguide trim of the light fixture of FIG. 1A according to an example embodiment.

FIG. 4A illustrates a top perspective view of the lightguide trim 102 of the light fixture 100 of FIG. 1A according to an example embodiment, FIG. 4B illustrates a bottom perspective view of the lightguide trim 102 of the light fixture 100 of FIG. 1A according to an example embodiment, and FIG. 4C illustrates a cross-sectional view of the lightguide trim 102 of the light fixture 100 of FIG. 1A according to an example embodiment. Referring to FIGS. 1A-4C, in some example embodiments, the lightguide trim 102 includes the upper portion 206 and the flange portion 110. The lightguide trim 102 includes a narrow edge 404 that is designed to receive a light emitted by the light source 310 of the light source board 202. The light source board 202 may have an opening 406 that is sized such that a portion of the reflector 104 can extend through the opening 406.

In some example embodiments, the flange portion 110 may include an inflexion portion 412 corresponding to the general portion of the flange portion 110, where the flange portion 110 starts turning upward as the flange portion 110 extends away from the upper portion 206 toward a narrow edge 402. For example, the inflexion portion 412 may be spaced or more distant from a ceiling plane 416 than an end portion 414 of the flange portion 110 that includes the narrow edge 402. For example, the end portion 414 that may be in contact with the ceiling plane 416.

In some example embodiments, the lightguide trim 102 includes guide poles 408, 410 that may be used to position the lightguide trim 102 in a desired location with respect to light source board 202 and the housing 108. For example, the guide poles 408, 410 may each be inserted in a respective one of the holes 316, 318 and may also be inserted in corresponding holes in the back wall 204 of the housing 108.

In some example embodiments, the broad surface 120 may reflect light the reaches the broad surface 120 through the lightguide trim 102. For example, the light that is emitted by the light source 310 may enter the narrow edge 404 of the lightguide trim 102 and travel through the lightguide trim 102. The pattern of the broad surface 120 may reduce the amount of the light that exits through the broad surface 120 by reflecting some of the light back into the lightguide trim 102, which may result in more light exiting the lightguide trim 102 through the broad surface 112 of the flange portion 110. In some example embodiments, the light exiting the broad surface 112 may have its highest intensity at the inflexion portion 412. In some example embodiments, a portion of the light that enters the lightguide trim 102 through the narrow edge 404 of the lightguide trim 102 may exit the lightguide trim 102 through the narrow edge 402.

In some example embodiments, the broad surface 112 may include a design, such as a logo, a directional symbol (e.g., an arrow, etc.), where the design may be illuminated by the light exiting the broad surface 112. For example, a particular design may be etched into the broad surface 112. In some alternative embodiments, portions of the lightguide trim 102 or the entire lightguide trim 102 may have a different shape than shown without departing from the scope of this disclosure. In some alternative embodiments, one or more of the guide poles may be omitted without departing from the scope of this disclosure.

Figure 5A:
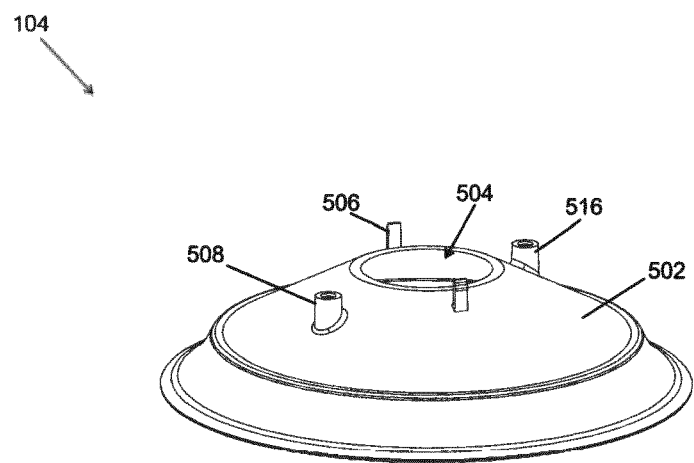
FIG. 5A illustrates a top perspective view of a reflector of the light fixture of FIG. 1A according to an example embodiment.
Figure 5B:
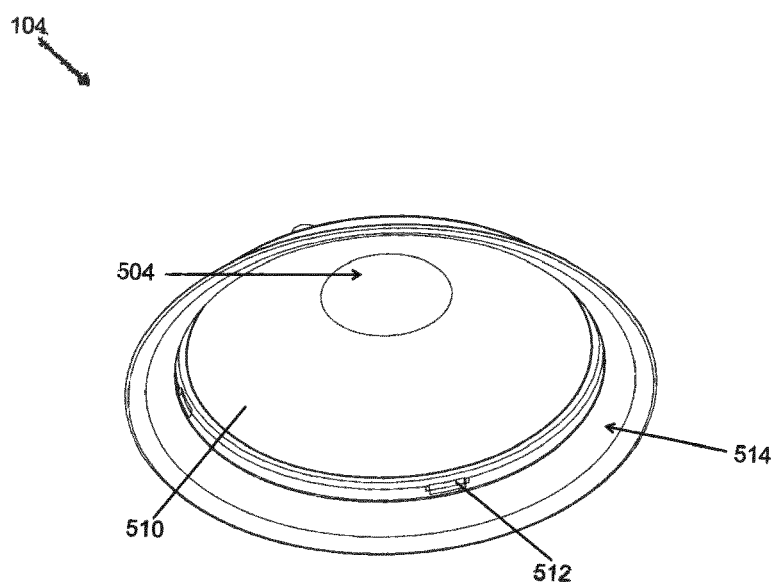
FIG. 5B illustrates a bottom perspective view of the reflector of the light fixture of FIG. 1A according to an example embodiment.

FIG. 5A illustrates a top perspective view of the reflector 104 of the light fixture 100 of FIG. 1A according to an example embodiment, and FIG. 5B illustrates a bottom perspective view of the reflector 104 of the light fixture 100 of FIG. 1A according to an example embodiment. Referring to FIGS. 1A-5B, in some example embodiments, the reflector 104 has an outer surface 502 and an inner surface 510. For example, both the outer surface 502 and the inner surface 510 may be reflective surfaces.

In some example embodiments, the reflector 104 may have an opening 504 that is aligned with the light source 302 of the light source board 202. The inner surface 510 may reflect the portion of the light emitted by the light source 302 toward an area below the light fixture 100 when the light fixture 100 is installed recessed in a ceiling. For example, a portion of the inner surface 510 may reflect a portion of the light emitted by the light source 302 toward the lens 106 that passes the light through toward the area below the light fixture 100.

In some example embodiments, the reflector 104 may include guide poles, such as the guide pole 506, that protrude out from the reflector 104 and that may be inserted in a respective hole, such as the hole 324, of the light source board 202. The guide poles, such as the guide pole 506, may also be inserted corresponding holes in the back wall 204 of the housing 108. The reflector 104 may also include bosses 508, 526 that extend out from the reflector 104 and may include hole for receiving fasteners that may be used to secure the reflector 104 to the light source board 202 and the housing 108.

In some example embodiments, the reflector 104 may include attachment tabs such as an attachment tab 512 that may be used to attach the lens 106 to the reflector 104. For example, the attachment tabs may protrude out from the inner surface 510 of the reflector 104 and may be inserted into matching slots of the lens 106. The lens 106 may be attached to the reflector 104 such that a portion of the reflector 104 is above the lens 106 and a portion of the reflector 104 is below the lens 106. For example, an opening 514 of the reflector 104 may be below the lens 106.

In some alternative embodiments, the reflector 104 may have a different shape than shown without departing from the scope of this disclosure. In some alternative embodiments, the lens 106 may be at a different location with respect to the inner surface 510 of the reflector 104 without departing from the scope of this disclosure.

Figure 6A:
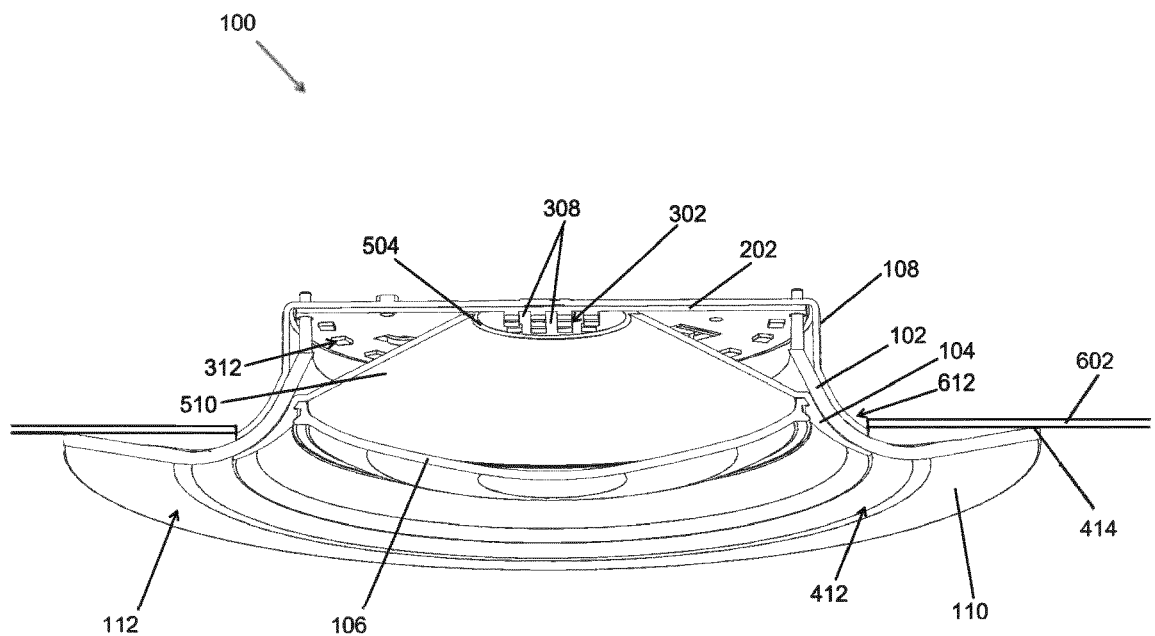
FIGS. 6A and 6B illustrate cross-sectional views of the recessed light fixture of FIG. 1A according to an example embodiment.
Figure 6B:
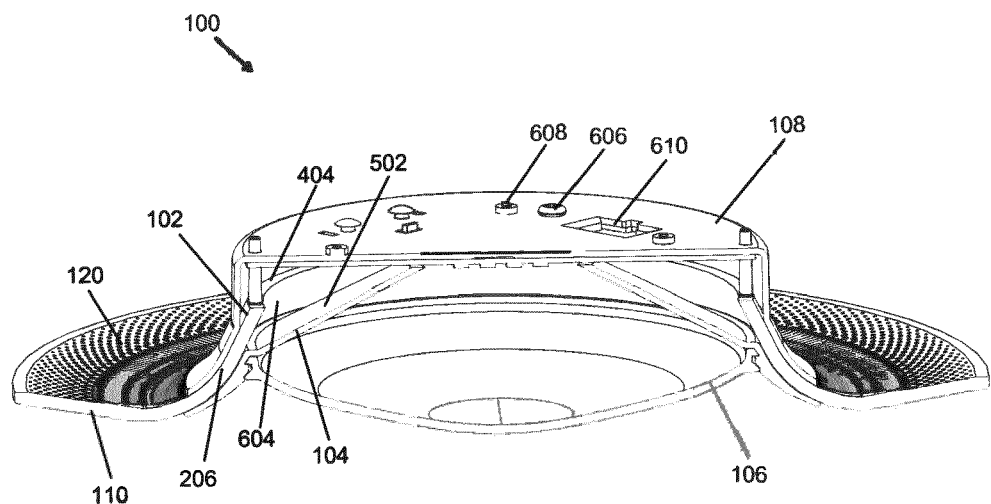
Figure 7:
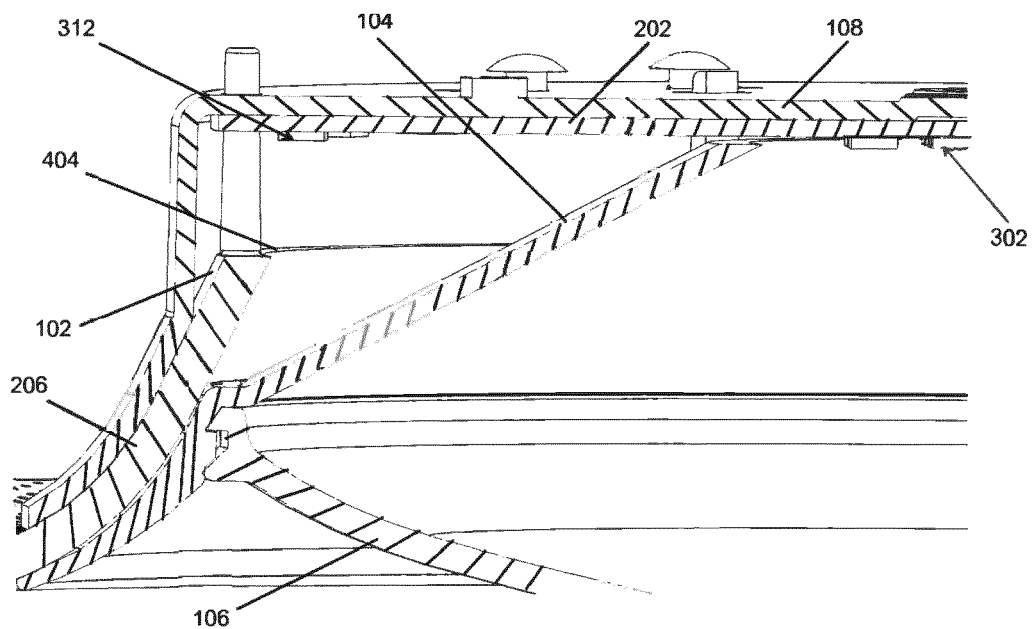
FIG. 7 illustrates a close-up view of a cross-section of the recessed light fixture of FIG. 1A according to an example embodiment.

FIGS. 6A and 6B illustrate cross-sectional views of the recessed light fixture 100 of FIG. 1A according to an example embodiment, and FIG. 7 illustrates a close-up view of a cross-section of the recessed light fixture 100 of FIG. 1A according to an example embodiment. Referring to FIGS. 1A-7, in some example embodiments, the light source board 202 is attached to the housing 108. The light source 302 of the light source board 202 is aligned with the opening 504 of the reflector 104 and positioned to emit a light toward the lens 106 and the inner surface 510 of the reflector 104. The light emitted by the light source 302 passes through the lens 106 directly or after reflection off the inner surface 510 of the reflector 104. In general, the light source 302 may emit a downlight that serves as an illumination light to the area below the light fixture 100.

In some example embodiments, the LEDs 312 of the light source 310 are positioned to emit a light toward the narrow edge 404 of the lightguide trim 102. For example, at least a portion of the light emitted by the LEDs 312 of the light source 310 may enter the lightguide trim 102 through the narrow edge 404 and exit the lightguide trim 102 through the broad surface 112 of the flange portion 110. As explained above, the flange portion 110 may include the inflexion portion 412. For example, the light emitted through the broad surface 112 may have the highest intensity at the inflexion portion 412. The light from the light source 310 emitted through the broad surface 112 of the flange portion 110 may be a nightlight that may have, for example, a dim level and/or a color temperature appropriate for night-time lighting.

In some example embodiments, the light sources 302, 310 of the light source board 202 may be controlled such that the light from the light source 302 is off when the light from the light source 310 is on. That is, the light fixture 100 may function to provide a nightlight. The light sources 302, 310 of the light source board 202 may be controlled such that the light from the light source 310 is off when the light from the light source 302 is on. Alternatively, both of the first light and the second light may be emitted. Alternatively, both the light sources 302, 310 may emit a respective light at the same time such that the light fixture 100 provides a downlight through the lens 106 and another light through the broad surface 112.

The reflector 104 may be positioned to block the light emitted by the LEDs 308 of the light source from reaching the narrow edge 404 of the lightguide trim 102. The reflector 104 may also block the light emitted by the LEDs 312 of the light source 310 from reaching the inner surface 510 of the reflector 104 and exiting through the lens 106. In some example embodiments, a portion of the light from the LEDs 312 of the light source 310 that reaches the outer surface 502 of the reflector 104 may be reflected back by the outer surface 502 to the broad surface 112. The reflected light may enter the lightguide trim 102 through a broad surface 604 of the lightguide trim 102 and through the narrow edge 404 of the lightguide trim 102.

In some example embodiments, the light source 310 may emit a particular color light as an alert/alarm light that is provided by the light fixture 100 through the broad surface 112 of the flange portion 110. For example, the light source 310 may emit a red light or another light that has a different color from the color of the light emitted by the light source 302 and provided through the lens 106. The red light from the light source 310 may be emitted through the broad surface 112 when the light from the light source 302 is turned off. Alternatively, the light from the light source 310 may be provided while the light source 302 is providing the light emitted through the lens 106.

In some example embodiments, the broad surface 112 may include a design, such as a logo, a directional symbol (e.g., an arrow), etc. For example, a particular design may be etched into the broad surface 112. A design may be illuminated or projected onto a surface (e.g., the ground) by the light exiting the broad surface 112.

In some example embodiments, the LEDs 312 of the light source 310 may emit red, green, and blue color lights. For example, the light source 310 may be controllable to provide a desired color light based on one or more of the red, green, and blue color lights.

In some example embodiments, the light fixture 100 may extend through an opening 612 in a ceiling 602. For example, the flange portion 110 of the lightguide trim 102 may be generally below the ceiling 602, and the upper portion 206 of the lightguide trim 102 may be generally above the ceiling 602. The flange portion 110, as it extends outward, may be curved upward such that the end portion 414 of the flange portion 110 comes in contact with a ceiling 602. Alternatively, the end portion 414 of the flange portion 110 may be curved upward but may not come in contact with the ceiling 602. For example, the upward curving of the flange portion 110 may block and reduce air flow between the plenum (i.e., the space behind ceiling 602) and the space below the ceiling 602.

In some example embodiments, the light fixture 100 may be positioned such that the housing 108 of the light fixture 100 extends down to the ceiling 602. For example, when the light fixture 100 is installed recessed in the ceiling 602 as shown in FIG. 6A, the housing 108 may extend down to the ceiling 602 such that the housing 108 covers a portion of the opening 612 in the ceiling 602. To illustrate, the bottom end portion of the housing 108 at the open end of the housing 108 may extend to below the ceiling 602 and may be in contact with the ceiling 602, for example, at the perimeter of the opening 612. In some example embodiments, the bottom end portion of the housing 108 may extend radially out beyond the bottom end portion of the reflector 104 and cover the opening 612 to block a view of the space at the back of the ceiling 602 through the transparent lightguide trim 102 from below.

In some example embodiments, fasteners, such as the fastener 606, may extend through holes in the housing 108 and the light source board 202 and may be inserted in the bosses 508, 516 of the reflector 104 to securely attach the reflector 104 to the housing 108. Because the light source board 202 is between the reflector 104 and the back wall 204 of the housing 108, the attachment of the reflector 104 to the housing 108 by fasteners, such as the fastener 606, may also serve to retain the light source board 202 attached to the housing 108. Fasteners, such as the fastener 608, may extend through a hole in the light source board 202 to securely attach the light source board 202 to the housing 108. In some example embodiments, the electrical cable 118 or one or more wires of the electrical cable 118 may be connected to the light source board 202 through an opening 610 in the housing 108.

In general, the lightguide trim 102 serves as a trim of the light fixture 100 while enabling the light fixture 100 to provide a second light. Using the lightguide trim 102 enables the light source 302 and the light source 310 to be on the same light source board 404.

In some alternative embodiments, the light fixture 100 may include more or fewer components than shown without departing from the scope of this disclosure. In some alternative embodiments, the components of the light fixture 100 may be attached to another one or more of the components of the light fixture 100 using other means than shown without departing from the scope of this disclosure.

Figure 8:
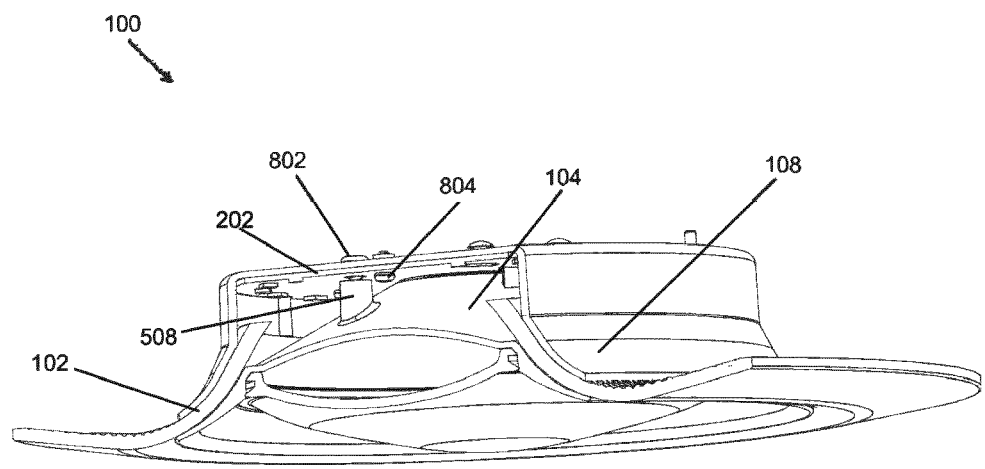
FIG. 8 illustrates another cross-sectional view of the recessed light fixture of FIG. 1A according to an example embodiment.

FIG. 8 illustrates another cross-sectional view of the recessed light fixture of FIG. 1A according to an example embodiment. Referring to FIGS. 1A-8, in some example embodiments, a fastener 802 that is similar to the fastener 606 shown in FIG. 6B is extended through corresponding holes in the housing 108 and the light source board 202 and inserted into the boss 508 of the reflector 104. The fastener 802 shown in FIG. 8 along with the fastener 606 may securely attach the reflector 104 to the light source board 202 and the housing 108. A portion of the lightguide trim 102 may be sandwiched between the reflector 104 and the housing 108 such that the lightguide trim 102 is held in position in the cavity of the housing 108. A fastener 804, the fastener 608 shown in FIG. 6B, and other similar fastener may be used to securely attach the light source board 202 to the housing 108.

Figure 9:
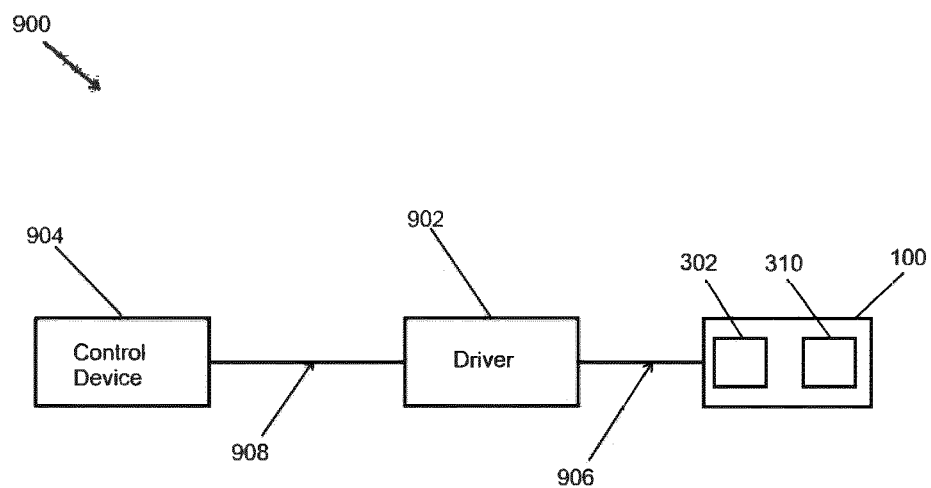
FIG. 9 illustrates a lighting system that includes the recessed light fixture of FIG. 1A according to an example embodiment.

FIG. 9 illustrates a lighting system 900 that includes the recessed light fixture 100 of FIG. 1A according to an example embodiment. Referring to FIGS. 1A-9, in some example embodiments, the lighting system 900 includes a driver 902, a control device 904, and the light fixture 100. The driver 902 may be a driver that provides power compatible with the light sources 302, 310 of the light fixture 100. For example, the driver 902 may be a driver that provides power compatible with LEDs of the light sources 302, 310. To illustrate, the driver 902 may be coupled to light fixture 100 via an electrical connection that corresponds or includes the electrical cable 118 shown in FIG. 1A. The electrical cable 118 may include multiple wires that are used to provide power to the light sources 302, 310. The amount of power that the driver 902 provides to each of the light sources 302, 310 may be adjusted based on control input received from the control device 904.

In some example embodiments, the control device 904 may be used to control the operation of the light fixture 100 by controlling the driver 902. For example, the control device 904 may be a wall unit or a portable device. The control device 904 may be coupled to the driver 902 via a wired connection 908 (e.g., one or more electrical wires). Alternatively, the control device 904 may communicate with the driver 902 wireless to control the light fixture 100 by controlling the driver 902.

In some alternative embodiments, the driver 902 may be integrated with the light fixture 100 without departing from the scope of this disclosure.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the scope of the following claims, the scope of which are to be accorded the broadest interpretation so as to encompass modifications and equivalent structures.

The invention claimed is:

1. A recessed light fixture, comprising:
a first light source that emits a first light;
a second light source that emits a second light;
a reflector positioned to reflect at least a portion of the first light;
a lightguide trim positioned around at least a portion of the reflector, wherein the second light source is positioned to emit the second light toward a narrow edge of the lightguide trim; and
a housing, wherein an upper portion of the lightguide trim is at least partially positioned in a cavity of the housing and wherein a flange portion of the lightguide trim is at least partially positioned outside of the housing, wherein a first broad surface of the flange portion of the lightguide trim and a second broad surface of the flange portion of the lightguide trim are on opposite sides of the flange portion of the lightguide trim and wherein the second broad surface of the flange portion of the lightguide trim includes a patterned surface.

2. The recessed light fixture of claim 1, wherein the first light source and the second light source are positioned on a same side of a light source board.

3. The recessed light fixture of claim 2, wherein the housing functions as a heat sink to dissipate heat from the light source-board.

4. The recessed light fixture of claim 2, wherein the reflector is secured to the housing by one or more fasteners that extend through holes in the light source-board.

5. The recessed light fixture of claim 1, wherein the flange portion of the lightguide trim is oriented such that at least a portion of the second light that enters the lightguide trim through the narrow edge of the lightguide trim exits through the first broad surface of the flange portion of the lightguide trim.

6. The recessed light fixture of claim 4, wherein the first broad surface of the flange portion of the lightguide trim includes a pattern.

7. The recessed light fixture of claim 1, wherein the first light source is positioned in the cavity of the housing.

8. The recessed light fixture of claim 1, wherein a portion of the lightguide trim is between the reflector and the housing.

9. The recessed light fixture of claim 1, wherein the housing is sized such that the housing covers an opening in a ceiling when the light fixture is recessed through the opening, wherein the housing blocks a view of a space behind the ceiling through the lightguide trim from below the light fixture.

10. The recessed light fixture of claim 1, wherein the second light source is spaced from the narrow edge of the lightguide trim.

11. The recessed light fixture of claim 1, further comprising a lens attached to the reflector such that the first light emitted by the first light source passes through the lens to illuminate an area below the light fixture.

12. The recessed light fixture of claim 1, wherein the second light source has a dim level corresponding to a nightlight.

13. The recessed light fixture of claim 1, wherein the light fixture is controllable such that the first light source is off when the second light source is on.

14. The recessed light fixture of claim 1, wherein at least one of the first broad surface or second broad surface of the flange portion of the lightguide trim are viewable from below the light fixture when the light fixture is installed to a ceiling, and wherein the flange portion of the lightguide trim is substantially transparent when the second light source is off.

* * * * *